May 31, 1938.  G. RALSTON  2,118,899
TWO-STROKE CYCLE INTERNAL COMBUSTION ENGINE
Filed April 27, 1937  9 Sheets-Sheet 8

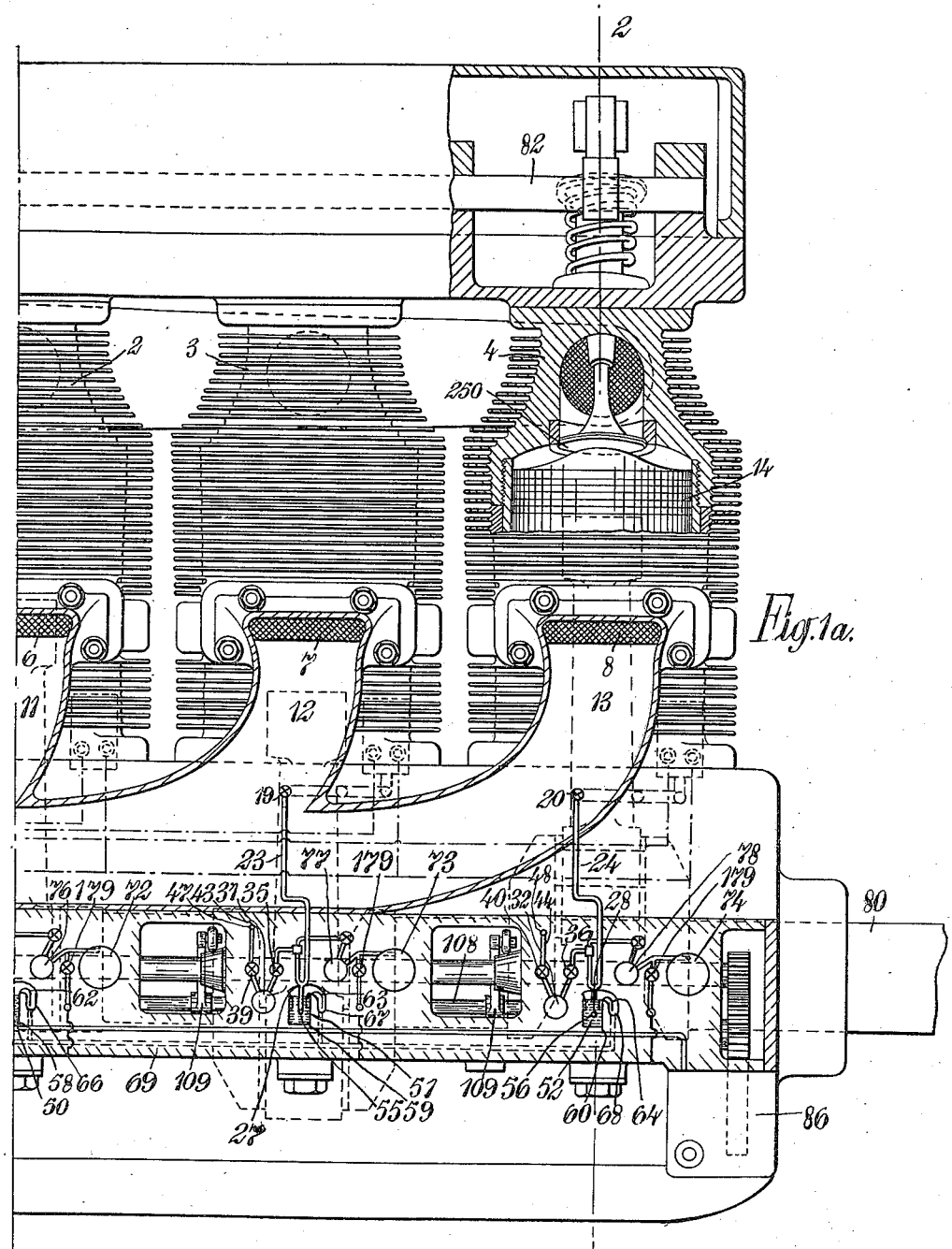

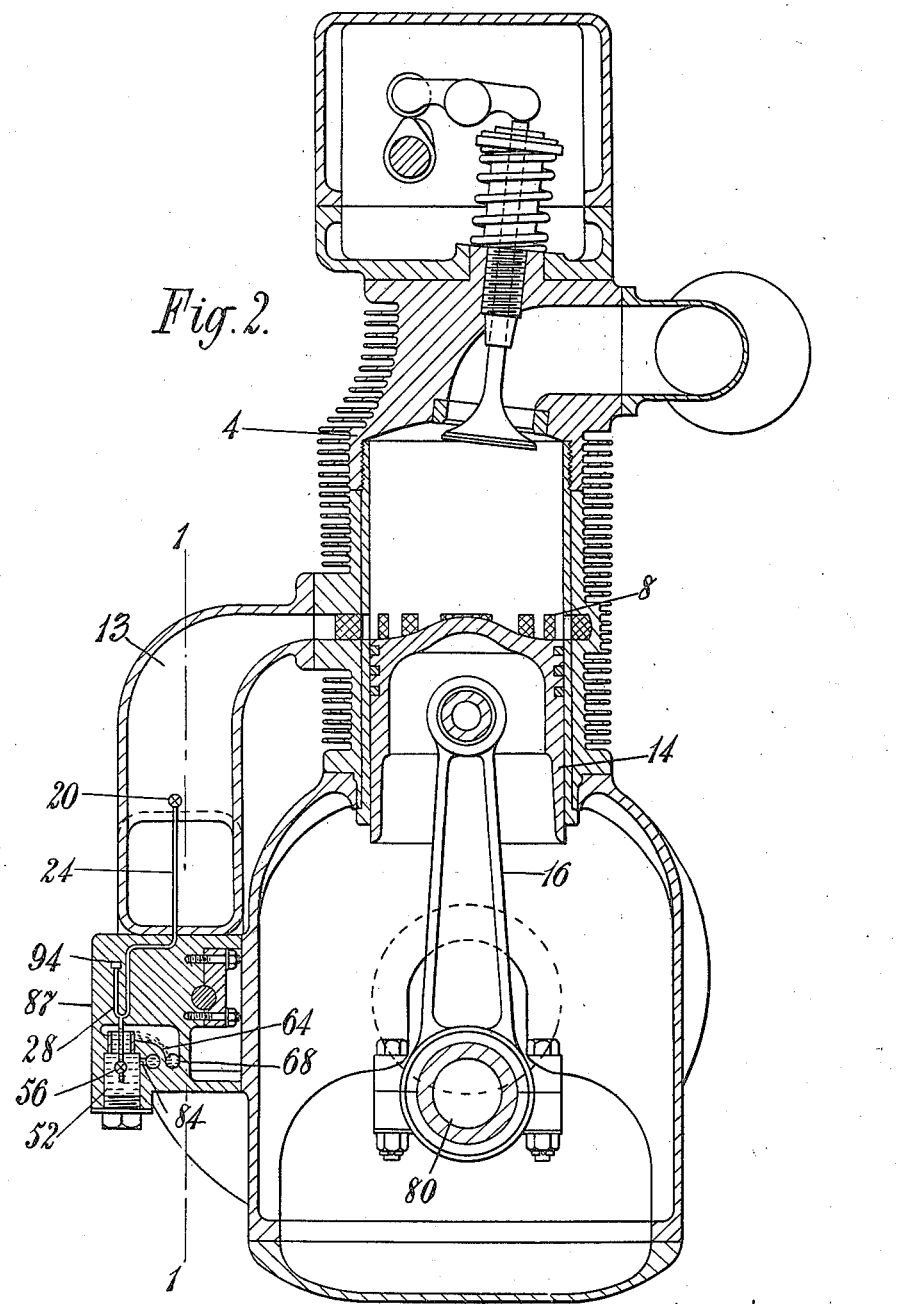

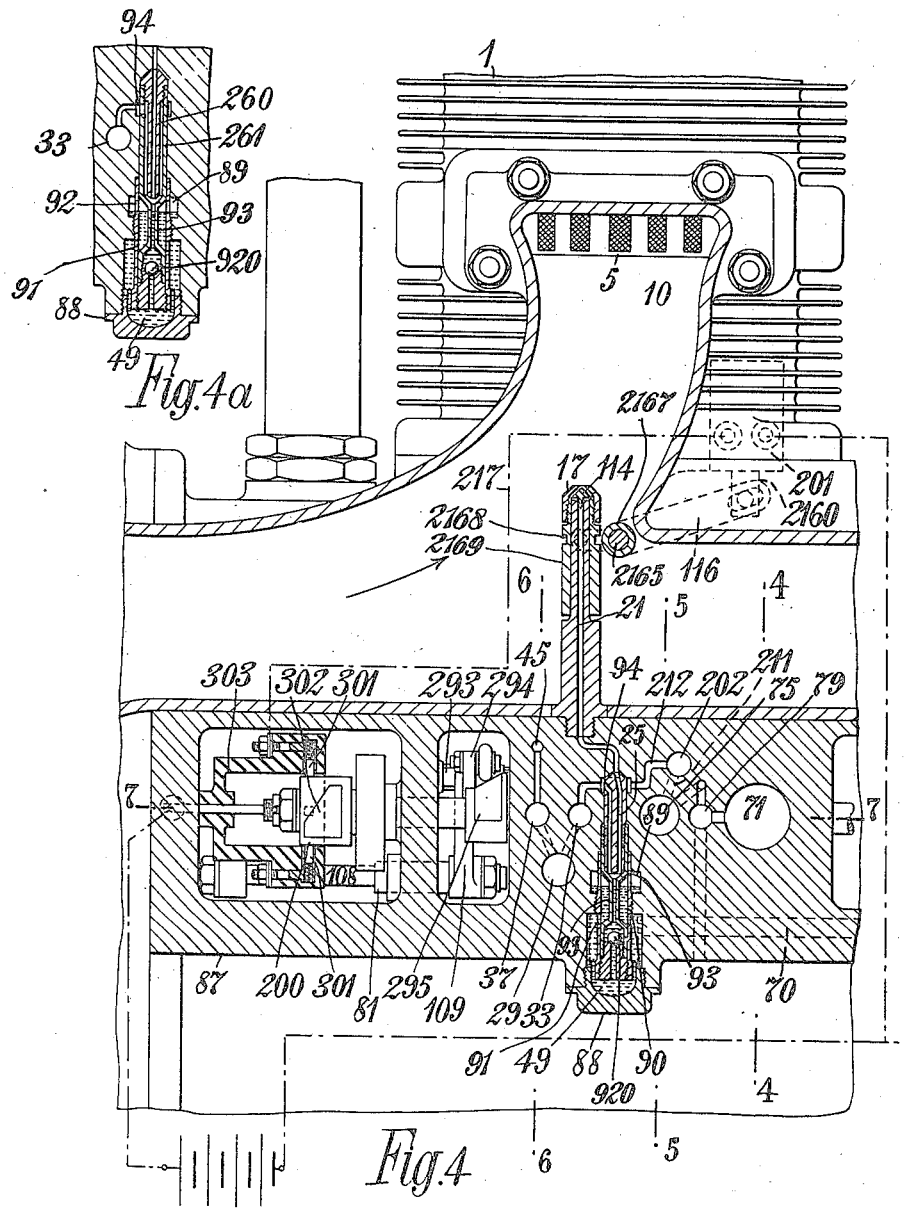

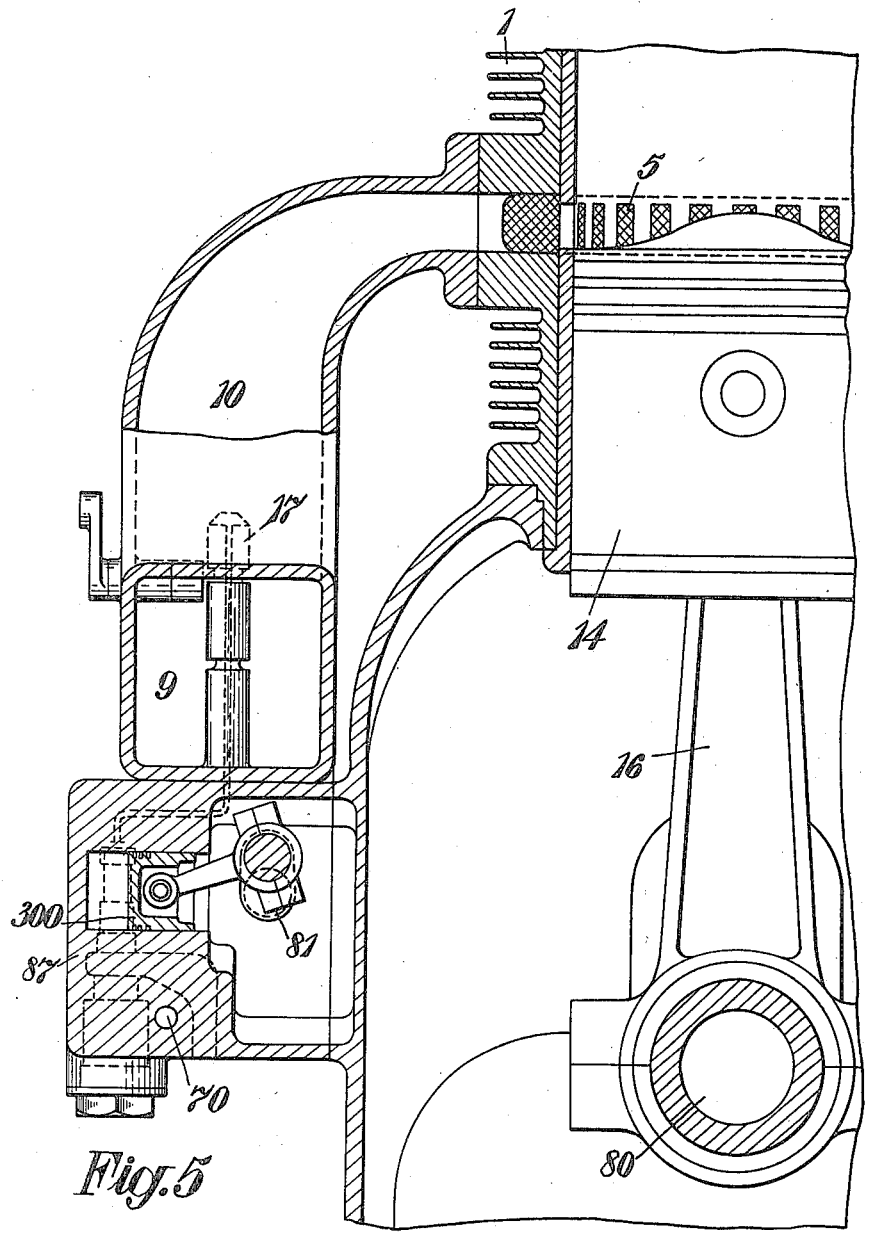

G. Ralston, Inventor
By Glascock Downing & Seebold, Attys.

Patented May 31, 1938

2,118,899

UNITED STATES PATENT OFFICE 2,118,899

TWO-STROKE CYCLE INTERNAL COMBUSTION ENGINE

Gavin Ralston, Weybridge, England

Application April 27, 1937, Serial No. 139,308
In Great Britain April 27, 1936

9 Claims. (Cl. 123—136)

This invention relates to two-stroke cycle internal combustion engines employing petrol or other low flash fuel and wherein the explosive mixture is obtained by spraying fuel into the stream of air which is caused to flow into the cylinder during such time as the inlet port is open.

The invention has for its object to provide a fuel metering and feeding system by which charges of the fuel of predetermined quantity can be delivered to the engine in the form of unbroken columns.

In the accompanying drawings,

Figure 1a is a similar view of the other half of the engine;

Figure 2 is a vertical section on line 2—2 of Figure 1;

Figure 4 is an enlarged sectional view of one of the air ducts and fuel injectors shown in Figure 1;

Figure 4a is a fragmentary vertical section of a modified construction of the fuel receiving chamber;

Figure 5 is a section on the line 4—4 of Figure 4, showing the air compression pump of the fuel injector;

Figure 1:
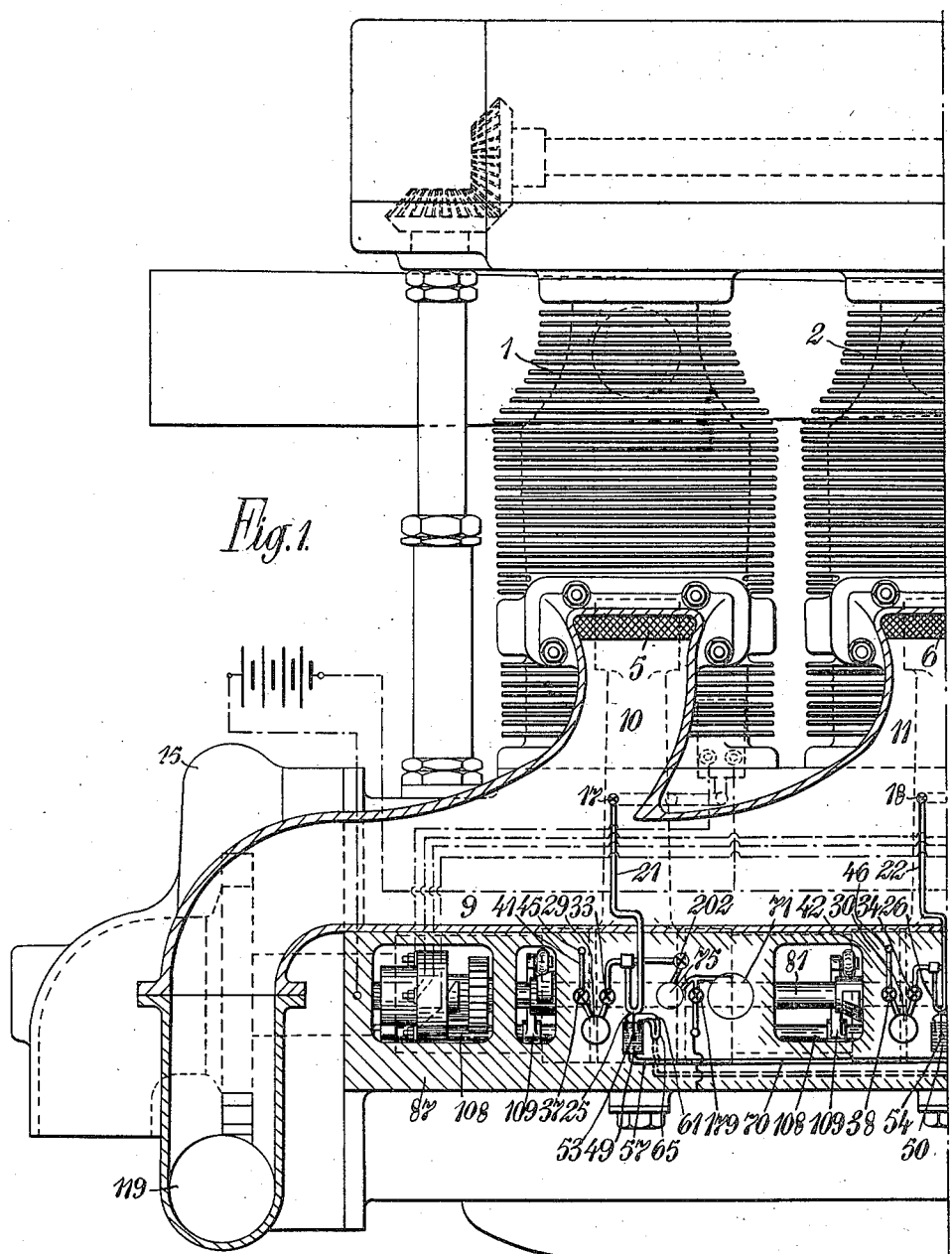
Figure 1 is a side elevation partly in section of one half of an internal combustion engine employing a fuel metering and feeding system in accordance with the invention, the section being taken on the line 1—1 of Figure 2.
Figure 3:
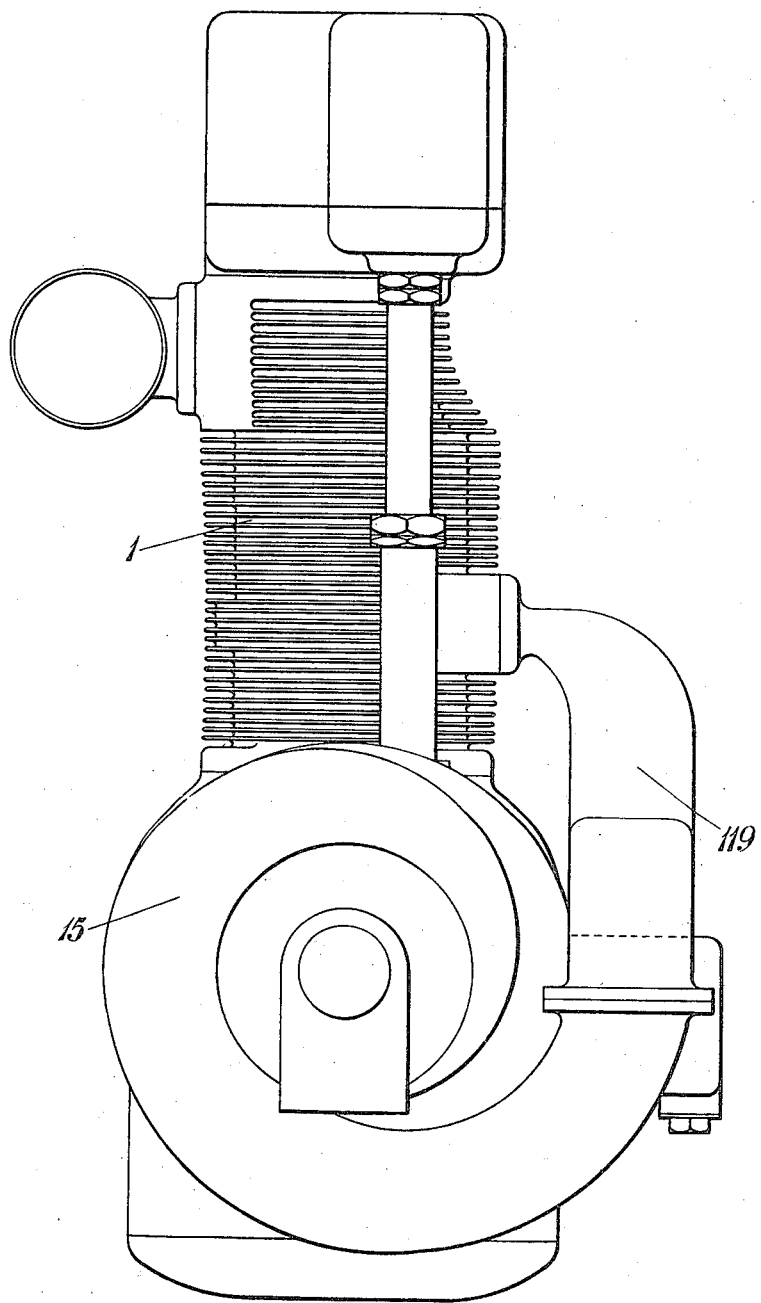
Figure 3 is an end view of Figure 1 looking upon the engine driven air blower and the air duct therefrom to the engine cylinders.

In carrying the invention into effect in one convenient manner as illustrated in the drawings and as applied by way of example only to a four cylinder air cooled engine, it being understood that the invention is applicable to engines having one or more cylinders with provision for cooling by air or otherwise, the four cylinders 1, 2, 3, 4, have their pistons 14 connected in the usual manner by connecting rods 16 to crankshaft 80 which has four cranks so disposed that one pair set at 180° to one another are at right angles to a second pair also set at 180° to one another, the cylinders having ports 5, 6, 7, 8 at the lower end thereof which are uncovered in turn as each piston completes its downward stroke during rotation of the engine crankshaft.

Incorporated in the engine so as to be driven from the crankshaft 80 is a centrifugal air blower 15 the outlet pipe 119 of which is connected by duct 9 and branch ducts 10, 11, 12, 13 to the cylinder inlet ports 5, 6, 7, 8, so that the air from the blower 15 is forced by the rotation of the engine crankshaft 80, along duct 9 and branch ducts 10, 11, 12, 13 and enters each cylinder 1, 2, 3, 4 in turn as each piston uncovers the ports 5, 6, 7, 8.

Situated within the entrances to the branch ducts 10, 11, 12, 13 where they join the duct 9 are valve controlled petrol or other low flash fuel spraying jets 17, 18, 19, 20 through which petrol or other low flash fuel in finely divided form is discharged into the air stream passing within the said ducts during the time when the inlet ports 5, 6, 7 and 8 are open to admit a combustible mixture to the cylinders. The periods of fuel spraying are so regulated that a quantity of pure air is permitted to pass through each cylinder ahead of the combustible mixture for the complete scavenging of the products of combustion from the cylinders.

Each of the spray jets 17, 18, 19, 20 has associated with it a separate fuel conveying mechanism, all of which mechanisms have the same characteristics and by means of which fuel is supplied at regulated intervals and in regulated quantities to the spray jets through pipes 21, 22, 23, 24.

Figure 8:
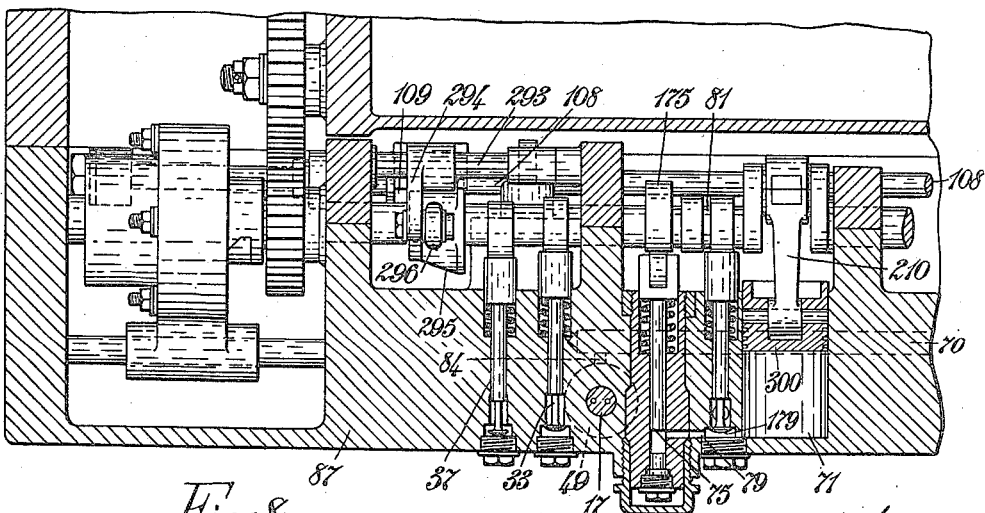
Figure 8 is a sectional plan view on the line 7—7 of Figure 4 showing the air compression pump, the displacement pump, the valves of the air suction pump and the means for varying the stroke of the variable air suction pump, these parts comprising a fuel injector unit.

The various fuel conveying mechanisms are disposed in a casing 87 attached to the crankcase of the engine and are operated by a common combined camshaft and crankshaft 81 (Figure 8) which is driven from the engine crankshaft 80.

The specific form of fuel conveying apparatus adopted, is one in which the petrol fuel is transferred from fuel reservoirs to the fuel spray jets without coming into contact with the reciprocating mechanism of the apparatus, whereby all moving parts subject to friction may be allowed to receive adequate supplies of lubricating oil during operation.

To this end air has been adopted as the medium by which the conveyance of fuel is secured between the fuel reservoirs and the fuel spray jets.

It is to be understood that in using air as the medium of propulsion there is no intention of conveying the fuel as a mixture of air and fuel, the air being used only as a propelling agent for a column of fuel of controlled and regulated quantity formed within the apparatus, which column is delivered to the spray jet in unbroken form for discharge as pure fuel pulverized into a finely divided spray by its passage through the labyrinth of the spray jet.

It has therefore been arranged that petrol fuel shall be drawn into and discharged from a small diameter chamber or preferably a U tube, or plurality of U tubes, of such bore that while the bore is not sufficiently small as to act as a capillary, it will be small enough to have created within it a column of liquid which, when acted upon by the pressure of air, will move out of the said U tube into and along a tube of equal bore to that of the U tube connecting the said U tube with the spray jet as a solid body without breaking up or mingling with the air until the whole of the liquid bulk has passed out of the spray jet under the impulse of the air behind it.

The engine is controlled as to speed and power by the provision of means within each of the fuel conveying units for varying in unison the quantity of fuel delivered to the fuel spray jets, and by arranging that the quantity of air delivered by the air blower to the cylinders is suitably regulated as to volume in proportion to the amount of fuel delivered to the fuel jets. The regulation of the volume of air required for satisfactory combustion may be achieved either by throttling the flow of air in proportion to the rate of fuel delivery, or by permitting the full volume of air delivered from the blower to flow to the cylinders in an unrestricted manner, so that the cylinders are always charged with air at the full blower pressure, and allowing the surplus of air beyond that required for combustion of the quantity of fuel sprayed into it, to escape from the exhaust valve by delaying the closing of the valve until after the closing of the inlet port and to an extent proportionate to the rate of fuel delivery. The latter course has many advantages and one means of securing a controllable variation in time of closing the exhaust valves is described later.

In regulating the power and speed of the engine by varying the time of closing the exhaust valve it also becomes necessary to make provision for the control of the opening of the spray jet valves on a variable time basis proportionate to the variation of the time of closing the exhaust valves, in order to ensure that under reduced fuel conditions a surplus of pure air is available for discharge from the exhaust and not a combustible mixture. Means for controlling the time of opening the spray jet valves is described later.

Full advantage may be taken of any pressure generated by the blower to secure overcharges of combustible mixture within the cylinders by arranging that the time of closing the exhaust valves is in advance of the closing of the air inlet ports. These conditions produce a pressure of air within the cylinder equal to that created by the blower and enables an increased charge of fuel to be introduced into the increased volume of air thus delivered to the cylinders.

Fuel is supplied to the spray jets 17, 18, 19, 20 from fuel receiving chambers or U tubes 25, 26, 27, 28 into which, at controlled intervals, fuel is drawn under the suction of air induced by the pistons or plungers of the variable stroke air suction pumps 29, 30, 31, 32 through mechanically controlled suction valves 33, 34, 35, 36, the proportions of the air suction pumps and the fuel receiving chambers or U tubes being such that fuel cannot be drawn beyond the chambers or U tubes into the suction pipes or valves of the air pump. Air which is drawn into the air suction pumps during the induction of fuel into the fuel receiving chambers is discharged on the return stroke of the pump pistons or plungers by way of mechanically controlled discharge valves 37, 38, 39, 40 and pipes 41, 42, 43, 44 through atmosphere outlets 45, 46, 47, 48. The fuel is drawn into the fuel receiving chamber or U tubes 25, 26, 27, 28 from reservoirs 49, 50, 51, 52 through non-return valves 53, 54, 55, 56 and pipes 57, 58, 59, 60 in which a constant level of fuel is maintained by creating a constant overflow of fuel from the reservoirs 49, 50, 51, 52 over spillways or overflow pipes 61, 62, 63, 64 into draining channels or pipes 65, 66, 67, 68 which connect to pipe 69 leading the excess of fuel by gravity action to a fuel overflow collecting tank, not shown.

Fuel collected in the overflow collecting tank is in turn transferred by mechanical or other means to the main fuel supply tank from which the fuel flowing to the fuel reservoirs 49, 50, 51 and 52 under mechanical or other impulse through pipe 70 is drawn.

Fuel which has been drawn into the fuel receiving chambers or U tubes 25, 26, 27, 28 is then subjected to the pressure of air generated in compression pumps 71, 72, 73, 74, which are preferably of the reciprocating or plunger type, and is forced out of the fuel receiving chambers 25, 26, 27, 28 in an unbroken column into the pipes 21, 22, 23, 24 leading to the fuel spray jets 17, 18, 19, 20 where it is held in restraint by the mechanically or electrically controlled valves 114, Figure 4, situated within each of the fuel jets 17, 18, 19, 20. By the time the piston of each compression pump 71, 72, 73, 74 has reached the end of its compression stroke air pressure will have been caused to rise between its piston and the column of liquid fuel in each of the pipes 21, 22, 23, 24 to a degree equal to that required to force the fuel through the spray jet in the time desired to complete the spray period.

During the compression strokes of the compression pumps 71, 72, 73, 74 the cylinders of air displacement pumps 75, 76, 77, 78, which are preferably of the single acting plunger type, and are in circuit with the compression pumps 71, 72, 73, 74, the fuel receiving chambers or U tubes 25, 26, 27, 28 and the fuel spray jets 21, 22, 23, 24 will have secured in common with all other parts of the circuit a full charge of high pressure air through plunger controlled air inlet ports 79 (Figure 8) which remain open from the commencement of the compression stroke of the compression pumps until just before the completion of the stroke, when the commencement of an air displacing movement by the plungers of the displacement pumps 75, 76, 77, 78 will commence to close the air inlet ports 79.

At the completion of the compression stroke of each compression pump 71, 72, 73, 74 the air displacing movement of each of the plungers of the air displacement 75, 76, 77, 78 will have closed its air inlet port 79, and will have entrapped the air compressed by its associated compression pump, between the displacement pump plunger and the column of liquid fuel in its associated fuel spray tube at a pressure equal to that required for discharge of the liquid fuel through the spray jet in the time in which it is desired to complete the spraying period.

As the inlet port of each of the air displacement pumps 75, 76, 77, 78 closes in turn, the valve of each of the fuel spray jets 17, 18, 19, 20 associated therewith is caused to open to commence the spraying of fuel through the jet. The continued displacing movement of the air displacement pump plunger, the total displacement capacity of which is arranged to be equal to the volume of the maximum column of liquid fuel to be sprayed, maintains a constant pressure of air behind the unbroken column of liquid fuel during the whole of the time it is issuing from the spray jet.

Figure 6:
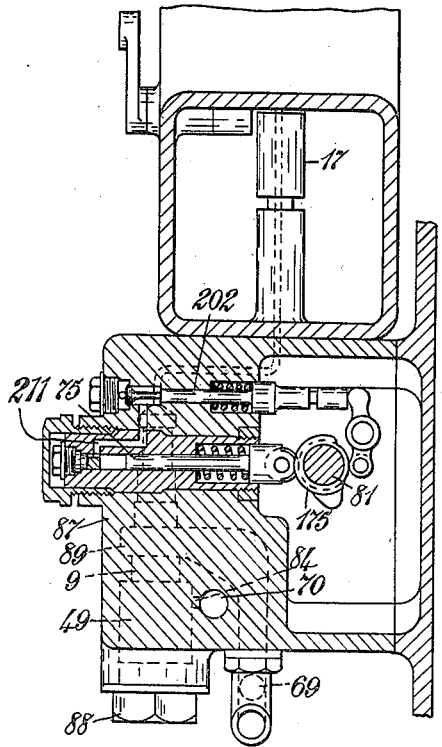
Figure 6 is a section on the line 5—5 of Figure 4 showing the air displacement pump and one of its associated valves.
Figure 7:
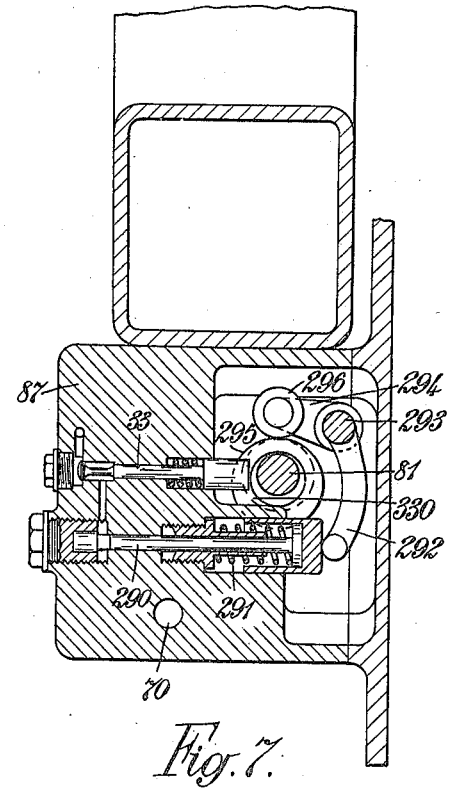
Figure 7 is a section on the line 6—6 of Figure 4 showing the variable stroke air suction pump and its atmospheric discharge valve.

The plunger of each air displacement pump 75, 76, 77, 78 is operated by a rotating cam 175 (Figure 6) which is so proportioned that a constant rate of travel is imparted to each pump plunger throughout its stroke with the result that the spray of finely divided fuel emerging from each fuel spray jet is constant in quantity during the whole time of discharge.

It is to be understood that the movement of fuel through each of the spray jets 17, 18, 19, 20 and their associated fuel conveying mechanisms is not intended to be secured at the same instant of time, but inasmuch as the various fuel conveying mechanisms supplying each spray jet are operated from a common source, as for instance by the camshaft 81 having cams or cranks thereon which may be disposed at such angularity with respect to one another as may be desired, a spray of fuel may be caused to issue from each of the jets 17, 18, 19, 20 in such sequence and at such intervals of time as may be found convenient for the efficient action of the engine.

Having generally described this embodiment of the invention I will now describe more fully the details thereof.

Referring particularly to Figures 4, 5, 6, 7 and 8 which illustrate the arrangement of one fuel spray jet with its associated fuel conveying mechanism, these figures clearly illustrate the means by which fuel is conveyed in variable quantities from the fuel supply source to the fuel jet of each cylinder of a multi-cylinder engine, since the mechanism associated with each cylinder has the same characteristics.

Fuel is fed to reservoir 49 through a suitably restricted orifice 84 by tube 70 which receives its supply from a main fuel supply tank, not shown, through an engine driven fuel supply pump 86 of suitable construction which is proportioned to deliver a constant excess of fuel to each reservoir beyond that required for combustion in the engine cylinders under all conditions of fuel consumption.

Fuel reservoir 49 is formed as a cavity within the casing 87 and the bottom end is fitted with a screwed plug 88. Above reservoir 49 another cavity is formed within the casing 87 to provide overflow chamber 89 communicating with an excess fuel collecting pipe 69. Into the neck formed between the reservoir 49 and the overflow chamber 89 a tube 90, having openings 91 and 92 formed therein, is screwed. Tube 90 forms a housing for the removable fuel receiving U tube 25 and its associated non-return valve 920 which are connected by a small diameter tube 93. By this arrangement petrol fuel flows under the urge of the fuel supply pump 86 along tube 70 into reservoir 49, where after filling the reservoir and tube 93 through non-return valve 920 it passes through opening 91 in tube 90 and overflows through opening 92 into overflow chamber 89 and thence to the excess fuel collecting pipe 69. Under the action of the fuel overflowing from openings 92, a constant level of fuel is maintained under all conditions of fuel consumption within tube 93 at a point immediately below the bottom of the fuel receiving U tube 25.

From the constant level of fuel thus created within tube 93 it is possible to raise fuel into the U tube 25 by the application of air suction to one end of the tube provided that the other end of the U tube is suitably closed to atmospheric pressure during suction, and that atmospheric pressure is maintained within the overflow chamber 89.

Provision is therefore made for the maintenance of atmospheric pressure of air within the overflow chamber 89 by providing a vent or tube leading from the chamber and communicating with the atmosphere in such manner as to prevent the discharge of any liquid fuel therefrom.

One end of the U tube 25 is open to the chamber 94, which communicates with the air suction pump 29, and the other end leads by way of the tube 21 to the fuel spray jet 17 wherein is situated the electrically or mechanically operated valve 114 which is arranged to regulate the spraying periods and seal the U tube 25 during suction of the fuel. Fuel is induced into the fuel receiving chamber or U tube 25 by the suction of air created by the outward stroke of the plunger 290 (Figure 7) of the suction pump 29 under the action of a coiled spring 291, air being drawn in from the U tube through the suction valve 33 which is controlled by a cam 330 on the camshaft 81. On the return stroke of the plunger 290 by the action of lever 292, rocker shaft 293 and sliding lever arm 294 acting under the control of cam 295 air which was drawn in during the suction stroke is expelled by way of mechanically controlled valve 37 to atmosphere outlet port.

The amount of fuel drawn into the fuel receiving chamber or U tube 25 may be increased by moving the arm 294 to the right (Figure 8) along the feathered rocking shaft 293 thereby bringing roller 296 into contact with the larger diameter of the cam 295 and so increasing the amplitude of movement of the arm 294. Movement of the arm 294 to the left brings the roller 296 into contact with the smaller diameter of the cam 295 and reduces the amplitude of movement of the arm with the result that the stroke of the suction pump plunger 290 is reduced and a corresponding reduction in the amount of fuel induced into the chamber 25 results. The amount of movement to the left or the right given to the sliding lever arm 294 is determined by the travel imparted to a sliding bar or shaft 108 which has mounted upon it an operating fork 109 engaging the lever arm 294. Any sliding movement to the left or right imparted to the bar 108 alters the position of the lever arm 294 in relation to the cam 295 and also alters to the same extent the position of similar lever arms 294 associated with the fuel spray jets 18, 19, 20 in relation to their respective cams, each lever arm having associated therewith its own operating fork 109 and all these arms and forks being mounted upon the common sliding bar 108 as is clearly shown in Figure 1.

This arrangement ensures that all the air suction pumps have the same amplitude of movement and induce equal quantities of fuel into their respective U tubes. Fuel having been induced into chamber or U tube 25 and retained therein by the action of non-return valve 920 before the return stroke of the plunger commences, suction valve 33 closes and valve 202 which has remained closed during the air suction period opens thus bringing the fuel chamber or U tube into communication with the compression pump 71 and the air displacement pump 75. At this stage the compression pump 71 which has, during the suction stroke of the air suction pump 29, drawn air into its cylinder through the inlet valve 179 which has now closed, commences a compression stroke while the plunger of the air displacement pump 75 remains stationary at the outward end of its stroke leaving the air inlet port 79 open to the compression pump. The outlet passage 211 of the air displacement pump 75 is also open, through the valve 202, to the fuel receiving chamber or U tube 25 and there is therefore a clear passage between the piston 300 of the air compression pump 71 and the column of liquid fuel lying in the fuel receiving chamber or U tube 25.

It is to be noted that the plunger of the air displacement pump 75 remains stationary, under the action of its actuating cam 175, at the outward end of its stroke until the piston 300 of the compression pump 71 is approaching the end of its stroke.

Under the action of its crank 210 on the camshaft 81 the piston 300 of the compression pump 71 continues its compression stroke and compresses the air contained in the air displacement pump 75 and the passages 211, 212 between it and the column of fuel in the fuel chamber 25 and gradually forces the unbroken column of liquid fuel out of the fuel chamber into the tube 21 leading to fuel spray jet where it is held under restraint by the closed fuel spray valve 114.

By the continuance of the compression exerted by the compression pump 71 the air pressure is raised by the time the piston 300 has reached the end of its stroke to a degree equal to that required to discharge the column of liquid fuel through the fuel jet in that fraction of time which is necessary to ensure that all fuel leaving the jet will enter the inlet port 5 of the cylinder during the time the piston of cylinder 1 has left this port uncovered.

Towards the end of the compression stroke of the compression pump 71 the plunger 75 of the air displacement pump will have commenced its displacement stroke and by the time the compression pump has completed its stroke the air inlet port 79 will be closed and highly compressed air is thus entrapped between the plunger 75 and the column of liquid fuel in the fuel spray tube 21. At this point the fuel spray valve 114 opens under the action of its solenoid 201 and associated lever system and liquid fuel in finely divided form issues from the fuel spray jet 17 under the urge of the compressed air behind the unbroken column of liquid fuel in spray jet tube 21. The displacement pump 75 as previously explained maintains a constant pressure of air behind the unbroken column of liquid fuel in the spray jet tube 21 during the whole time the column of fuel is issuing as a spray from the fuel spray jet 17 in order to ensure that a constant rate of flow is maintained from the spray jet.

As fuel issues from the fuel spray jet 17 its finely divided particles mix with the moving air stream in the duct 10 and pass as a combustible mixture through the port 5 in the cylinder 1 which port at this stage is uncovered by the piston on this cylinder. The compression pump piston 300, the plunger 75 of the air displacement pump, the valves 179, 202, 33, 37, and the plunger 290 of the suction pump are all driven by the combined camshaft and crankshaft 81, which also operates corresponding mechanism of the spray jets 18, 19, 20 by suitable gearing from the engine crankshaft 80.

The fuel spray jet 17 may be of any construction suitable for converting an unbroken column of liquid into a finely divided spray as the liquid passes through the jet passages, and the spray valve 114 may be formed as an integral part of the spray jet, in which case the spray jet and the valve 114 are arranged to have a sliding movement with respect to the spray jet body under the control of lever 116 operated by the solenoid 201, so that the end of the tube 21 in the spray jet body may be closed or opened at the required intervals by the action of this solenoid. The time of closing the valve 114 in the fuel spray jet bears a constant relation to the time of the closing of the inlet port 5 under all conditions of engine load and speed, and is so arranged that all combustible mixture formed within the duct 10 will have passed, under the urge of the air stream in the duct 9, into the cylinder before the inlet port 5 is closed by the engine piston corresponding to this cylinder.

In view of the fact that the fuel spraying periods are completed at a constant time it follows that variations in the quantity of fuel to be sprayed must be controlled by varying the time of opening the fuel spray jet valves. This means that as the quantity of fuel to be sprayed is reduced and the time of opening the fuel spray valve is correspondingly delayed a larger quantity of pure air is admitted to the cylinders ahead of the combustible mixture so long as the flow of air from the blower is unrestricted.

This larger quantity of pure air will be in excess of that required for combustion of the fuel and therefore arrangements are made to delay the closing of the engine exhaust valves in proportion to the reduction in the amount of fuel to be sprayed in order to allow the excess of pure air to escape from the cylinders.

Figure 4B:
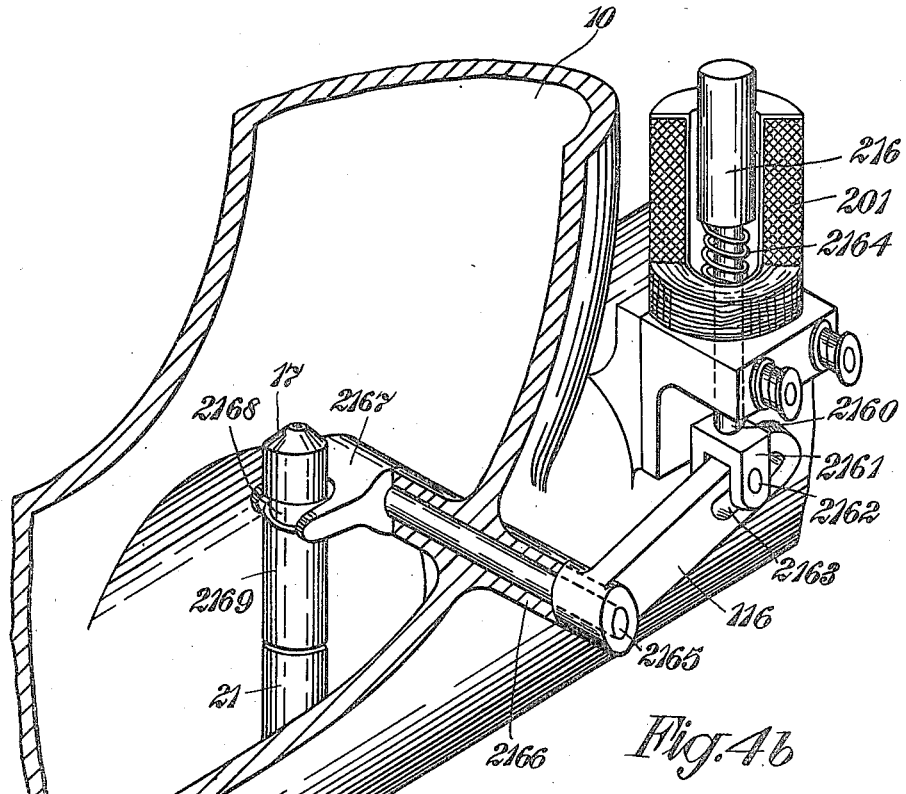
Figure 4b is a fragmentary perspective view partly in section showing on an enlarged scale one of the solenoids and associated parts for opening and closing the spray jet valves.
Figure 4C:
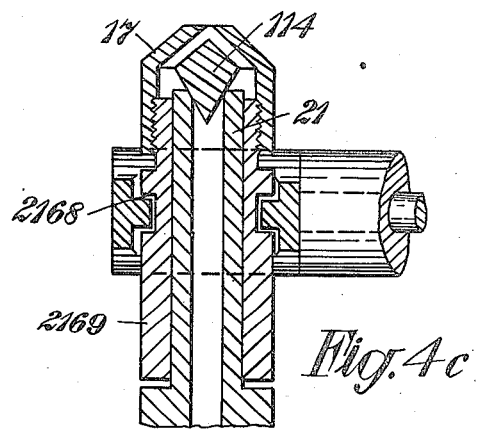
Figure 4c is an enlarged vertical fragmentary section through a spray jet valve.

The time of opening a fuel spray valve may be determined as illustrated in Figures 4, 4b and 4c where the valve 114 actuated by solenoid 201 and associated armature and lever system 216 and 116 bracketed upon the duct 10 is controlled by an electric current set up in a circuit 217 comprising solenoid 201, brushes 301 and commutator 200, in which brushes 301 slidably mounted upon and contacting with the face of the engine driven rotating commutator 200 having shaped metal contacts 302 embedded within its insulated face, are caused to lower the armature 216 of the solenoid 201 and lift its associated valve 114 at an earlier or later time according to the position given to the brushes 301 in relation to the contact faces 302 of the commutator. The armature 216 has an extension 2160 which passes through the bottom of the solenoid and is secured to a stirrup 2161 which has a cross pin 2162 located within a slot 2163 in the lever 116, the extension 2160 carrying a spring 2164 which returns the armature to the position shown in Figure 4b when the solenoid is de-energized and maintains the armature in such position in which the valve 114 is closed upon the upper end of the pipe 21. The lever 116 is secured at its pivotal end to a rod 2165 which passes through a boss 2166 in the casing forming the duct 10 and carries at its inner end a stirrup 2167 the arms of which engage within a groove 2168 formed on the outside of a sleeve 2169 to which the valve 114 and nozzle 17 are secured and which sleeve 2169 is slidable upon the outside of the pipe 21. Thus when the solenoid is energized the downward movement of the armature 216 will cause the lever 116 to pivot and so rotate the rod 2165 to cause the fork 2167 to swing upwardly, the result of which swinging movement will cause the sleeve 2169 to travel upwardly with respect to the pipe 21 and so cause the valve 114 to be unseated therefrom.

The metal contact faces upon the commutator are so disposed that early contact with the brushes prolongs the period of opening of the valve 114 and late contact shortens the period of opening, while the time of closing the valve is constant for all positions of the brushes.

For the purpose of varying the time of opening each fuel spray valve 114 in its relation to the cycle of operations of the fuel metering and feeding mechanism previously described, the commutator brush holder 303 (Figure 4) is secured upon the fuel suction controlling shaft 108, so that any displacement of the fuel suction cam-roller 296 (Figure 8), in relation to its associated cam 295, created by any sliding movement imparted to the said shaft 108 is equally imparted to the brush holder 303 in relation to its associated commutator 200 with the result that earlier or later contact is established between brushes 301 and the shaped metal contacts 302 of the commutator 200 according to the position of shaft 108. The commutator brush holder 303 carries a plurality of brushes corresponding one to each cylinder of the associated engine.

Movement may be imparted to shaft 108 by hand or mechanical means and it may be interconnected with the engine throttle control by any of the recognized methods in order to establish a satisfactory relationship between the amount of fuel and air supplied to the engine under all conditions of power and speed.

Figure 9:
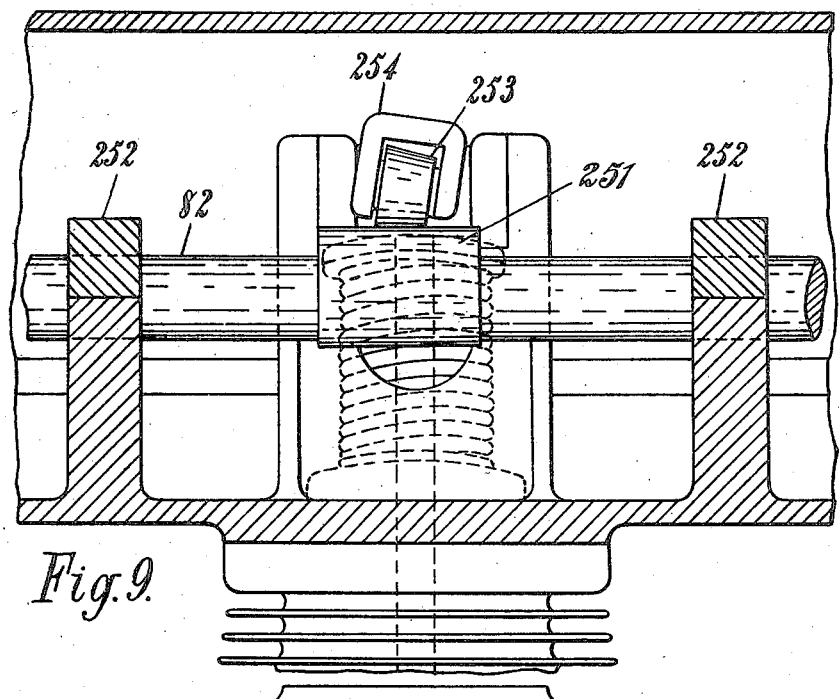
Figure 9 is an enlarged fragmentary sectional view across the top of one of the cylinders showing the arrangement of camshaft and cam by which variation in the length of opening of the exhaust valve is attained.
Figure 10:
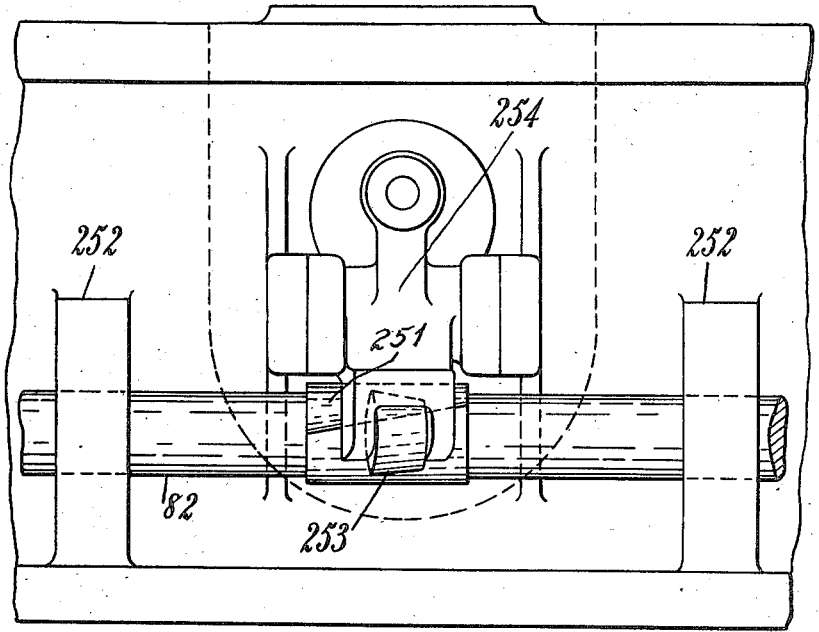
Figure 10 is a plan view of Figure 9.

Figures 9 and 10 illustrate an arrangement of means whereby variation in the time of closing an engine exhaust valve 250, while the opening time is kept constant, may be achieved. In this arrangement a cam 251 which is of a form proportioned to give at one end a long period of opening to the exhaust valve and at the other end a short period of opening and graduated degrees of opening at intermediate points, while the closing time is constant through its length, is formed integrally with engine driven camshaft 82. Camshaft 82 runs in bearings 252 in which it is adapted to slide longitudinally at will for the purpose of bringing any portion of the cam 251 under a roller 253 carried by the exhaust valve rocker shaft 254 and thus advancing or retarding the time of opening and increasing or decreasing the length of opening of the valve.

This method of regulating engine power and speed avoids undue reduction of the velocity of the air stream from the blower and ensures satisfactory mixtures of fuel and air entering the cylinders under all conditions of engine load and obviates the possibility of combustible mixture remaining in the inlet duct.

According to the modified construction of fuel receiving chamber illustrated in Figure 4a instead of employing a U tube there is provided a pipe 260 which depends into the hollow upper extension 261 of the conduit 93 so that this chamber is open to the air suction pump when desired.

I claim:
1. Means for metering and feeding petrol or other low flash fuel to an internal combustion engine comprising for combination with each engine cylinder, an air suction pump, an air pressure pump, a chamber in which a constant level of the fuel is maintained, a tube connected between the said pumps and in communication with the said fuel chamber, means for actuating the suction pump to cause a reduction in the pressure of the air in the said tube and thereby draw a predetermined quantity of fuel from the said fuel chamber into the said tube in the form of a column, a fuel spray jet, a valve controlling the opening and closing of the said jet with respect to the said tube and means for actuating the air pressure pump to cause a body of air to act as a displacing means upon the column of fuel to deliver this column of fuel from the said tube to the fuel spray jet the said tube having a bore of such size that the successive columns of fuel formed therein are not disintegrated by the air suction or pressure which act thereon but are maintained as unbroken columns.

2. Means as claimed in claim 1 comprising an air displacement pump for delivering the fuel columns through the spray jet.

3. Means as claimed in claim 1 wherein the said tube includes a U tube in which the fuel columns are formed and an extension of one limb of the U through which each fuel column is delivered to the spray jet.

4. Means as claimed in claim 1 comprising an air displacement pump and wherein air entrapped between the plunger of the compression pump and an unbroken column of the fuel at the pressure required for the discharge of the fuel through the spray jet is displaced by the movement of the plunger of the air displacement pump at a constant rate.

5. Means for metering and feeding petrol or other low flash fuel to an internal combustion engine comprising for combination with each engine cylinder, an air pressure pump, a variable stroke air suction pump, a chamber in which a constant level of the fuel is maintained, a U tube connected between the said pumps and in communication with the said fuel chamber, a fuel spray jet in communication with the U tube via an extension of one leg of the U, means for actuating the suction pump to cause a reduction in the pressure of the air in the said tube and thereby draw a predetermined quantity of fuel into the tube from the said fuel chamber in the form of a column, and means for actuating the air pressure pump to cause a body of air to act as a displacement means upon the column of fuel within the U tube and deliver the said column along the said extension of the U tube and to the spray jet, the said U tube and also the extension thereof having a bore of such size that the successive columns of fuel formed in the U tube and delivered to the extension are not disintegrated by the air suction or pressure but are maintained as unbroken columns until the fuel has passed completely through the spray jet.

6. Means as claimed in claim 5 comprising an air displacement pump and means for actuating same at a constant rate of displacement to discharge each unbroken column of fuel, conveyed by the air pressure pump into the said U tube extension, through the fuel spray jet at a constant rate in a finely divided form.

7. Means for metering and feeding petrol or other low flash fuel to an internal combustion engine comprising for combination with each engine cylinder, an air suction pump, an air pressure pump, a chamber in which a constant level of the fuel is maintained, a fuel spray jet, a tube connected between said pumps and adapted to have communication with the said fuel chamber and with the said jet alternately, means for actuating the suction pump to cause a reduction in the pressure of the air in the said tube and thereby draw a predetermined quantity of fuel from the said fuel chamber into the said tube in the form of a column, an automatic suction actuated valve controlling communication between the fuel chamber and the said tube so that the valve is opened when the suction pump is actuated, and closed when the suction pump is inoperative, means for actuating the air pressure pump to cause a body of air to act as a displacing means upon the column trapped within said tube by closure of the said valve to deliver this column of fuel from the said tube to the fuel spray jet, the said tube having a bore of such size that the successive columns of fuel formed therein are not disintegrated by the air suction or pressure which act therein but are maintained as unbroken columns, a second valve controlling the passage of each liquid column from the said tube to the spray jet and means closing this second valve when each fuel column is being formed in the said tube.

8. Means as claimed in claim 7 comprising means for opening the said second valve at varying intervals of time in the cycle of operations to regulate the passage of quantities of fuel which will vary in accordance with the load and speed of the associated engine.

9. Means as claimed in claim 7 comprising means for opening the said second valve at varying intervals of time in the cycle of operations the said opening means comprising a commutator, angularly disposed contact faces constructed in said commutator, slidable brushes associated with said commutator, a source of electric current, a solenoid adapted to be energized at intervals of time which will vary according to the position the said slidable brushes will adopt in relation to said commutator under varying fuel requirements of the associated engine, by current from said source under the control of said commutator and brushes, and means connecting said solenoid and said valve adapted to open the valve when the said solenoid is energized.

GAVIN RALSTON.